United States Patent [19]

Inoue

[11] Patent Number: 5,430,653
[45] Date of Patent: Jul. 4, 1995

[54] NAVIGATION SYSTEM WITH ROUTE DETERMINATION PROCESS CAPABLE OF DETERMINING A DESIRED ROUTE READILY AND QUICKLY

[75] Inventor: Nobutaka Inoue, Aichi, Japan

[73] Assignee: Masprodenkoh Kabushikikaisha, Japan

[21] Appl. No.: 134,575

[22] Filed: Oct. 12, 1993

[30] Foreign Application Priority Data

Oct. 12, 1992 [JP] Japan .................................. 4-273082
Jan. 27, 1993 [JP] Japan .................................. 5-011727

[51] Int. Cl.$^6$ .......................................... G06F 165/00
[52] U.S. Cl. ................................. 364/444; 364/449; 340/995
[58] Field of Search ............... 364/444, 460, 462, 449; 340/988, 995; 342/357, 457

[56] References Cited

U.S. PATENT DOCUMENTS

| | | | |
|---|---|---|---|
| 4,403,291 | 9/1983 | Von Tomkewitsch | 364/424 |
| 4,550,317 | 10/1985 | Moriyama et al. | 340/995 |
| 4,689,747 | 8/1987 | Kurose et al. | 364/449 |
| 4,796,189 | 1/1989 | Nakayama et al. | 364/449 |
| 4,879,658 | 11/1989 | Takashima et al. | 364/449 |
| 4,882,689 | 11/1989 | Aoki | 364/449 |
| 4,926,336 | 5/1990 | Yamada | 364/444 |
| 4,943,925 | 9/1990 | Moroto et al. | 364/449 |
| 4,951,211 | 8/1990 | De Villeroche | 364/444 |
| 5,067,082 | 11/1991 | Nimura et al. | 364/449 |
| 5,121,326 | 6/1992 | Moroto et al. | 364/449 |
| 5,168,452 | 12/1992 | Yamada et al. | 364/444 |
| 5,184,123 | 2/1993 | Bremer et al. | 340/995 |
| 5,220,507 | 6/1993 | Kirson | 364/444 |
| 5,231,584 | 7/1993 | Nimura et al. | 364/444 |
| 5,272,638 | 12/1993 | Martin et al. | 364/444 |
| 5,274,387 | 12/1993 | Kakihara et al. | 342/451 |

FOREIGN PATENT DOCUMENTS

| | | |
|---|---|---|
| 0158214 | 10/1985 | European Pat. Off. . |
| 0323230 | 7/1989 | European Pat. Off. . |
| 0323246 | 7/1989 | European Pat. Off. . |
| 0348528 | 1/1990 | European Pat. Off. . |
| 0485120 | 5/1992 | European Pat. Off. . |
| 63-188517 | 5/1989 | Japan . |
| 1130299 | 5/1989 | Japan . |
| 1136300 | 5/1989 | Japan . |
| 2079453 | 1/1982 | United Kingdom . |
| 2111204 | 6/1983 | United Kingdom . |
| 2238870 | 11/1989 | United Kingdom . |
| 93/09510 | 5/1993 | WIPO . |

*Primary Examiner*—Michael Zanelli
*Attorney, Agent, or Firm*—Davis, Bujold & Streck

[57] ABSTRACT

A navigation system for a vehicle is provided with a route determination process by which a road is selected and determined as a route according to a designated starting point and a driving direction. The route is indicated on a road map displayed on a screen, and stored. Further routes are automatically determined, intersection by intersection, according to the category of the road determined earlier as a route. Cancellation of the route thus determined is performed intersection by intersection and reported to a user by erasion of the route indication. The road map displayed on the screen always places the last intersection on the determined and uncanceled route at its center, thereby allowing the user to confirm the proceeding of the route determination and the route cancellation process.

10 Claims, 9 Drawing Sheets

FIG. 3

| ADDRESS OF INTERSECTION(C) & BORDER POINT(N) | C1 | N1 | C2 | N2 | N4 | C3 |
|---|---|---|---|---|---|---|
| LONGITUDE (x-COORDINATE) | XC1 | XN1 | XC2 | XN2 | XN4 | XC3 |
| LATITUDE (y-COORDINATE) | YC1 | YN1 | YC2 | YN2 | XN4 | YC3 |
| ADDRESS OF NEXT INTERSECTION & BORDER POINT | N9 C4 | N1 C1 C2 | N12 N7 N2 | C2 N3 | N3 C3 | N6 N13 N14 |
| NODE LIST | n1 n2 | | | | | |
| ROAD CATEGORY | 2 0 0 | 0 0 0 | 0 1 1 | 1 1 | 1 1 1 | 1 0 0 |

FIG. 4

| REGISTERED INTERSECTION NUMERAL (Pi) | P1 | | P2 | | | | P3 |
|---|---|---|---|---|---|---|---|
| REGISTERED BORDER POINT NUMERAL (Pij) | | P11 | | P21 | P22 | P23 | |
| ADDRESS OF INTERSECTION (C) & BORDER POINT (N) | C1 | N1 | C2 | N2 | N3 | N4 | C3 |

NAVIGATION SYSTEM WITH ROUTE DETERMINATION PROCESS CAPABLE OF DETERMINING A DESIRED ROUTE READILY AND QUICKLY

BACKGROUND OF THE INVENTION

1. Field of the Invention

This invention relates to a navigation system for a vehicle by which a route to be taken is displayed on a CRT screen, liquid crystal display, or other display means to navigate the vehicle. More particularly, this invention relates to such a navigation system provided with a route determination process by which a desired route can be determined readily and quickly.

2. Prior Art

Known navigation systems are provided with a screen on which a road map is displayed. In one type of system, a route is determined by pinpointing and thereby inputting intersections consecutively from a starting point to a destination by a cursor on the screen or by means of a light pen. In another type of system, once a starting point and destination are input, the shortest route from the starting point to the destination is automatically determined according to map data previously stored, and indicated on the map displayed on the screen.

These types of navigation systems, however, have the following shortcomings. While affording selection of a desired route, the former type of system requires meticulous manual labor of designating each intersection. On the other hand, the latter type of system also falls short, in spite of its operation facility, because it uses previously stored and not up-dated program data in determining a route. When unexpected repair work is undergoing at an automatically selected route, or when the route the user preferred is not selected, the user has to correct the route, after completion of the automatic route determination, in the same laborious manner as in the former type of system.

SUMMARY OF THE INVENTION

Wherefore, an object of this invention is to provide a navigation system for a vehicle where and by which a desired route can be readily and quickly determined.

In order to attain the stated object, the navigation system of the present invention includes, as shown in FIG. 1, display means M1, map data storage means M2, display control means M3, direction input means M4, first road selection means M5, second road selection means M6, route indication control means M7, first display change control means M8, determination means M9, route cancel input means M10, route cancel control means M11, second display change control means M12, and route determination resumption means M13.

The display means M1 displays a road map thereon.

The map data storage means M2 stores map data to be displayed on the display means M1. The map data includes road category data indicative of the category type of each road included in the map data.

The display control means M3 controls the display means M1 to display a road map according to the map data stored in the map data storage means M2.

The direction input means M4 inputs a designated starting or base point and a driving direction.

The first road selection means M5 selects a road according to the driving direction designated through the direction input device M4 and referring to the map data, and determines the road as a route to take from the designated base point to a next intersection.

The second road selection means M6 selects a road according to the road category type of the determined route, and, referring to the map data, determines the road as a further route to take to a next intersection from the end of the route determined earlier.

The route indication control means M7 controls the display means M1 to indicate on the displayed road map the route determined by the first road selection means M5 and second road selection means M6.

The first display change control means M8 first determines whether a next intersection on the route to be indicated by the route indication control means M7 is on the road map currently displayed on the display means M1, and, if it is determined that the next route intersection is beyond the currently displayed road map, changes the displayed road map so as to include the next intersection.

The determination means M9 first determines whether or not a route has been selected and determined by the second road selection means M6. If it is determined that a route has been determined, the determination means M9 then causes the second road selection means M6 to select a further road connected to the route determined earlier.

The route cancel input means M10 receives an input instruction to halt the first road selection means M5 and the second road selection means M6 from performing route determination and to cancel the determined route.

The route cancel control means M11, responsive to the input instruction to cancel the determined route, cancels the corresponding determined route, and erases the corresponding indication of the route.

The second display change control means M12 first examines whether the last remaining uncancelled route intersection is still on the road map currently displayed on the display means M1 after the route cancel control means M11 has erased the indication of the canceled portion of the route. If it is determined that the last uncancelled route intersection is beyond the currently displayed road map, the route cancel control means M11 changes the displayed road map to include the last intersection.

The route determination resumption means M13 causes the first road selection means M5 to resume its action upon receipt of an input designating a driving direction, recognizing the end of the uncanceled route newly as a base point, when the determination means M9 determines that the second road selection means M6 has not determined a further route or when the route cancel control means M11 has finished cancellation of the route in response to an instruction to cancel the determined route.

In operation, a starting or base point and a driving direction of the vehicle is input via the direction input means M4. The first road selection means M5 then selects, based on the map data stored in the map data storage means M2, a road starting from the input base point and lying in the input driving direction, and determines the road as a route to take from the base point to a next intersection.

Subsequently, the second road selection means M6 selects, based on the map data and the road category data, a road of the same category type as the route determined earlier lying ahead of the intersection at the end of the determined route, and determines the road as a further route to take from the intersection to a next intersection.

When the determination means M9 determines that a route has been determined, the second road selection means M6 is activated again to select a further road connected to the end of the route determined earlier.

Since selection of a road by the second road selection means M6 is made according to the road category of the route determined earlier, it is possible that there is no road available in the designated direction of the same category and that the second road selection means M6 cannot select a road. Therefore, the present invention adopts the determination means M9 to examine whether or not a road selection has been performed. Road selection is thus continued, intersection by intersection, by the second road selection means M6 according to the category of the road selected by the first road selection means M5 until the second road selection means M6 cannot select a further road.

Responsive to determination of route effected by the first and second road selection means M5 and M6, the route indication control means M7 is activated so as to indicate the determined route on the road map displayed by the display control means M3 on the display means M1.

During the route indication effected by the route indication control means M7, the first display change control means M8 examines whether the next intersection on the route to be indicated is on the road map currently displayed on the display means M1. If it is determined that the next intersection is beyond the currently displayed road map, the first display change means M8 changes the displayed road map to include the next intersection.

This is because that it could take time to indicate a route since the route indication control means M7 operates to indicate a route on the road map currently displayed on the display means. Specifically, if the display control means M3 always acts to display the road map along the determined route even when the distance between the intersections on route is long, the indication of the determined route takes time.

Thus the present navigation system adopts the first display change control means M8 which changes the display when a next intersection is not on the currently displayed road map to one including the next intersection. As a result, the route indication is quickly performed and route determination is speedily executed.

If an instruction is input to halt route determination effected by the first and second road selection means M5, M6 and to cancel the determined route, the route cancel control means M11 cancels the route, intersection by intersection, from the end of the determined route toward the base point according to the instruction and erases the corresponding route indication.

When erasing the route indication, the second display change control means M12 examines whether the last intersection at the end of the route, still effective after the cancellation, is currently displayed on the display means M1. If the last intersection is not on the currently displayed road map, the second display change means M12 changes the road map to include the last intersection. Thus, route cancellation is quickly finished.

If the second road selection means M6 cannot select a road or when route cancellation is finished, the route determination resumption means M13 awaits information of a driving direction with the end of the previously determined route as a new base point and resumes, upon receipt of this information from the direction input means M4, the operation of the first road selection means M5.

Thus, if the second road selection means M6 cannot select a road or when termination of route determination or cancellation of the determined route is effected in response to an instruction from the route cancel input means M9, the end of the route that is not canceled is regarded as a new base point from which to resume route determination. When the driving direction is input via the direction input means M4, the first and second road selection means M5, M6 are again activated to automatically determine a further route starting from the new base point.

BRIEF DESCRIPTION OF THE DRAWINGS

An embodiment of the present navigation system is explained hereunder, by way of example, referring to the drawings, although it is understood that other embodiments are within the scope of the present invention, in which:

FIG. 3 is a table illustrating intersection data and border point data referred to in the determination and the indication of a route;

FIG. 4 is a table showing data indicative of route intersections and route border points registered in effecting the route determination and the route indication;

DETAILED DESCRIPTION OF THE PREFERRED EMBODIMENT

Figure 1:
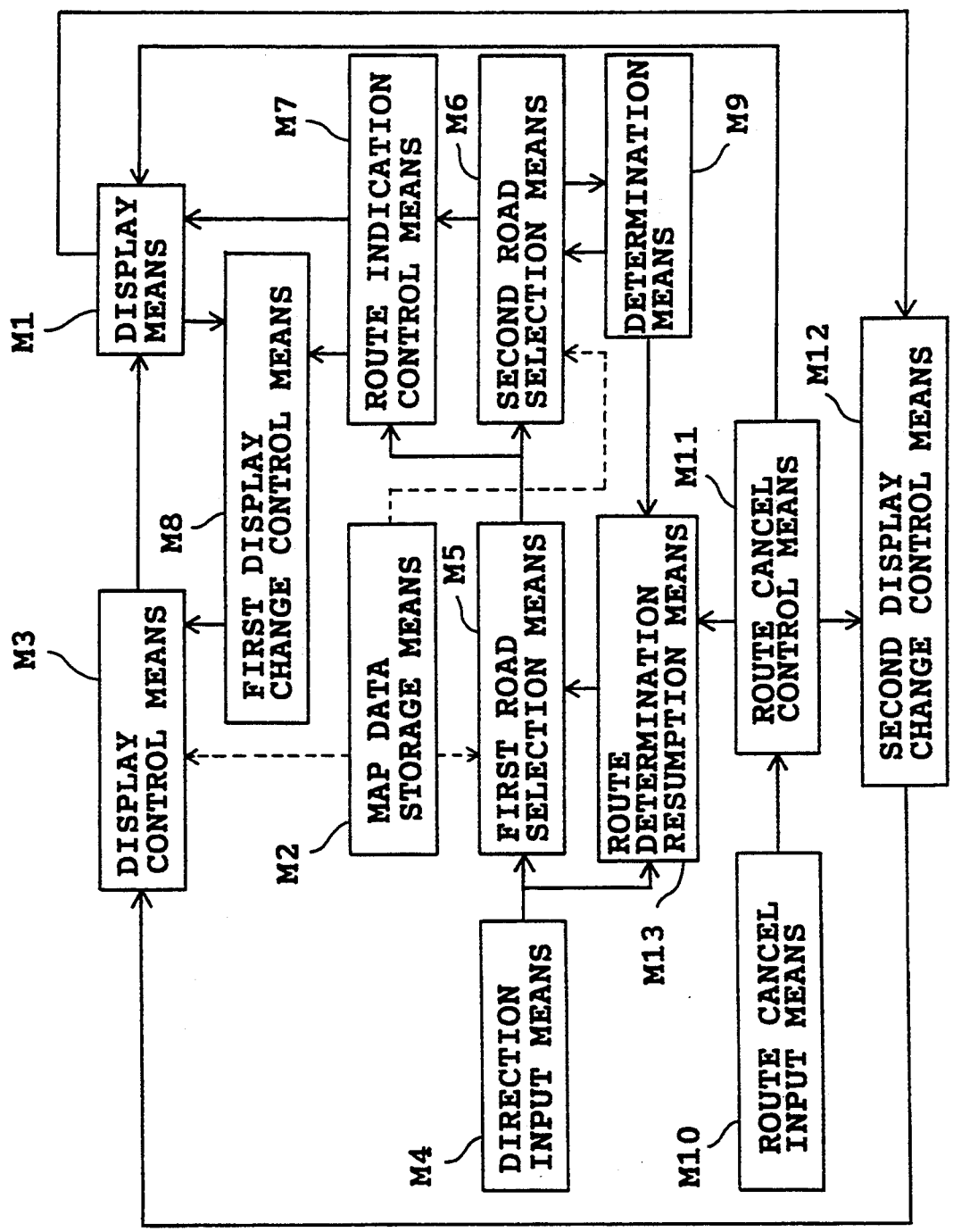
FIG. 1 is a block diagram schematically showing the navigation system of the present invention.
Figure 2:
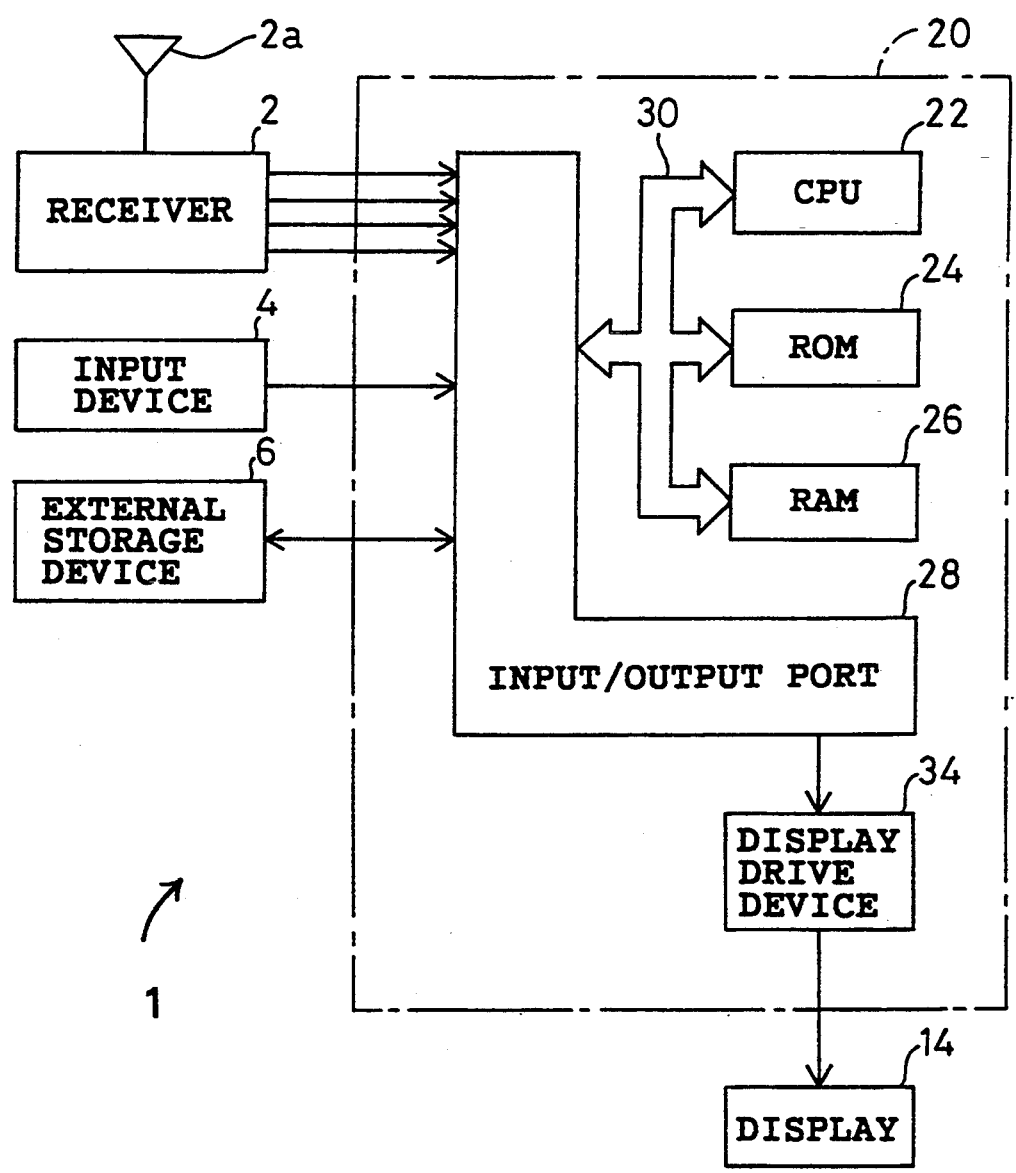
FIG. 2 is a block diagram schematically showing a complete navigation system.

As shown in FIG. 2, a navigation system 1 according to the present invention includes an antenna 2a and a known receiver 2 for receiving transmissions from an artificial satellite that is a part of Global Positioning System GPS. Diffusion conversion is performed on the received transmission signal to obtain longitude data, latitude data, and altitude data indicative of the location where the signal is received, i.e. current position of the vehicle, and velocity data indicative of the traveling speed of the receiver, i.e. speed of the vehicle.

The navigation system 1 also includes an input device 4 as both the direction input means and route cancel input means for inputting a base point, a driving direction, a cancellation of a determined route and other instructions.

The navigation system 1 also includes an external storage device 6, a display drive device 34, and a display 14. The external storage device 6 may be an optical disk or magnetic disc and serves as map data storage means M2. The display 14 may include cathode ray tubes (CRT), a liquid crystal screen, or other display means and displays road map and other necessary information.

The navigation system 1 further includes a main controller 20. The main controller 20 retrieves data from the receiver 2, the input device 4, the external storage device 6 and other parts of the navigation system, and controls the display 14 to indicate a road map and a route as determined from the data retrieved.

Figure 9:
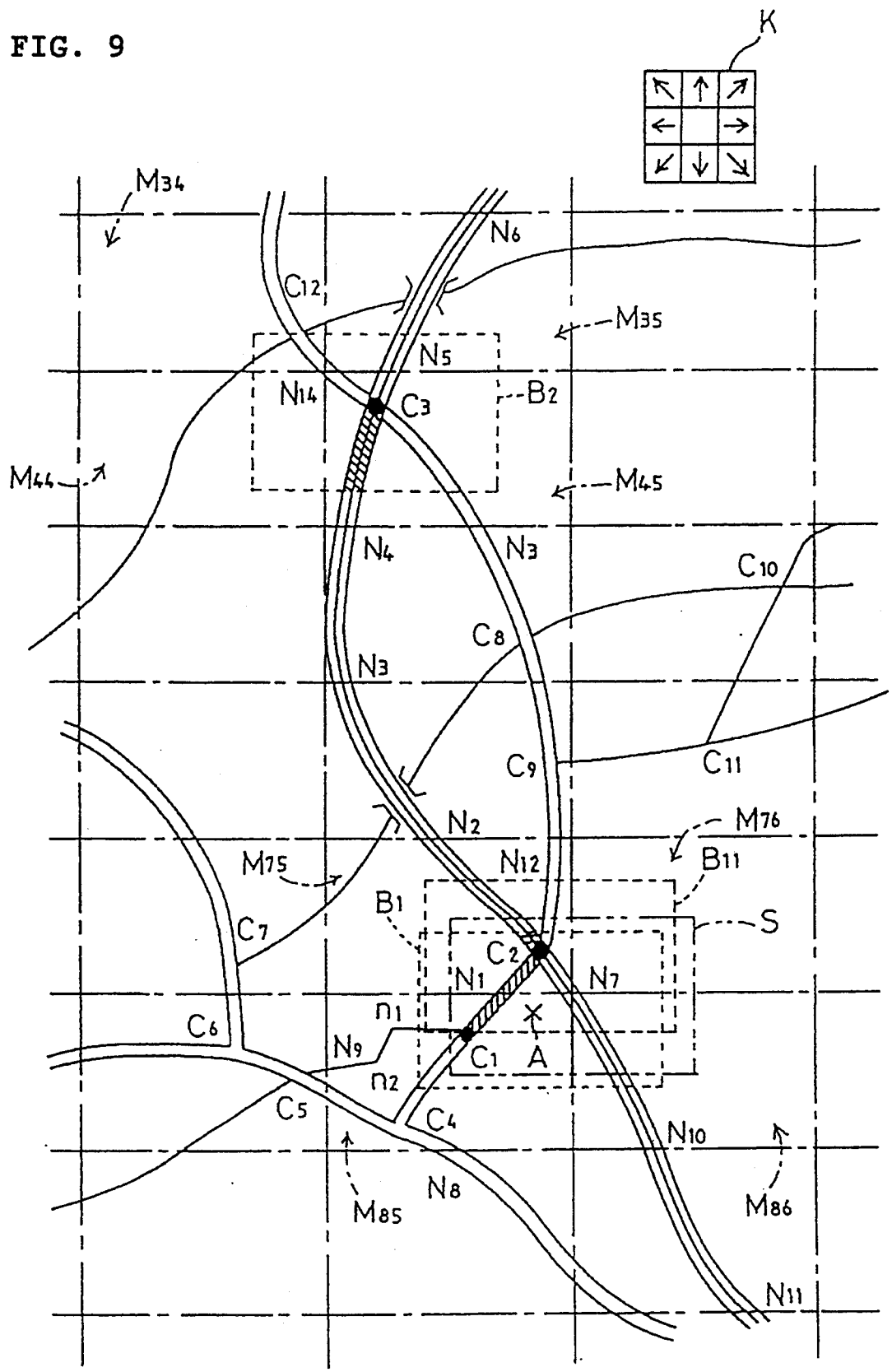
FIG. 9 is an illustration showing how the determined route is indicated on the map displayed on the screen.

As shown by dot-dash lines in FIG. 9, the map data stored in the external storage device 6 takes the form of $n \times m$ pieces of map data units M11, M12, ... Mnm. The size of each unit Mnm of map data corresponds to the size of the map that the screen of the display 14 can show at one time. The external storage device 6 also stores intersection data and border point data. The intersection data concerns each intersection of the roads included in the stored map data. The border point data concerns the location where a road crosses a border line of the map units Mnm.

The intersection data and the border point data, as shown in FIG. 3, include an intersection address $C_i$ (i: integer value from 1 to n), border point address $N_i$, longitude (x-coordinate) and latitude (y-coordinate) data together indicative of the location of the intersection and the border point, address $C_i$ of a next intersection, address $N_i$ of a next border point, a node list indicative of an inflection point between the intersection and the next intersection and between the border point and the next border point, and road category data indicative of the category of the road between the intersection and the next intersection and between the border point and the next border point.

In the instant embodiment, roads are put into three categories of "0", "1", and "2", respectively indicative of highway, turnpike, and other ordinary roadways.

A part of the intersection data and border point data shown in FIG. 3 will be now explained hereunder referring to FIG. 9. As shown in FIG. 9, an intersection C4, border point N1, and border point N9 are positioned adjacent to an intersection C1. The road running through the intersection C1 from the intersection C4 toward the border point N1 is a highway. Another road diverging from the intersection C1 to the border point N9 is an ordinary roadway. FIG. 3 shows, in its first column address, data of intersection C1, longitude data XC1 and latitude data YC1 of the intersection C1, address data of the intersection C4, border point N1, and border point N9 that are positioned next to the intersection C1, data indicative of nodes n1 and n2 between the intersection C1 and border point N9, and data indicative of the category of each road running from the intersection C1 to the border point N1, border point N9, or to the intersection C4.

During the route determination process, which will be explained in detail later, register data is prepared by storing the address of each intersection on the road selected as a route consecutively in the register as intersection numeral $P_i$. The register data also includes the address of each border point intermediate registered intersections. The address of each border point is also stored consecutively in the register as border point numeral $P_{ij}$ (j: integer value from 1 to m). The register data is used in the navigation process to guide a driver by indicating the determined route.

A part of the register data shown in FIG. 4 will now be explained hereunder referring to FIG. 9. In FIG. 9, point A denotes a base point. The register data shown in FIG. 4 specifies a route to take which starts at the intersection C1, passes an intersection C2, takes a road which runs in a direction up and to the left in that figure, and finally reaches an intersection C3. As shown in FIG. 4, the address of the intersection C1 is first stored in an area corresponding to registered intersection numeral P1. Next, the address of the border point N1 which is intermediate the intersections C1 and C2 is stored in an area corresponding to registered border point numeral P11. Subsequently, the address of the intersection C2 is stored in an area corresponding to registered intersection numeral P2. Further, the address of the border points N2, N3, and N4 which are intermediate intersections C2 and C3 are stored in areas corresponding to registered border point numerals P21, P22, and P23, respectively. Consequently, the address of the intersection C3 is stored in an area corresponding to registered intersection numeral P3. Thus, the registered border point numeral $P_{ij}$ corresponds to the registered intersection numeral $P_i$, and its value for j is increased by one every time a border point intermediate registered intersection $P_i$ and the next registered intersection $P_i+1$ is registered.

The main controller 20 is a known microcomputer including CPU 22, ROM 24, RAM 26, input/output port 28, and bus line 30 connecting these components. The main controller 20 is provided with a display drive device 34 which sends out drive signals to and thereby activates the display 14. Responsive to instructions input by a user at the input device 4, the main controller 20 executes a corresponding process of either the route determination process or the navigation process.

During the navigation process, the current position of a moving vehicle is continually detected and indicated on the road map, and the route determined in the route determination process is indicated, referring to the data registered as route intersections and route border points, on the displayed road map to guide a driver. Further details of the navigation process are irrelevant to the present invention and are therefore omitted for simplification.

The route determination is hereunder explained with reference to FIG. 5 though FIG. 8.

Figure 5:
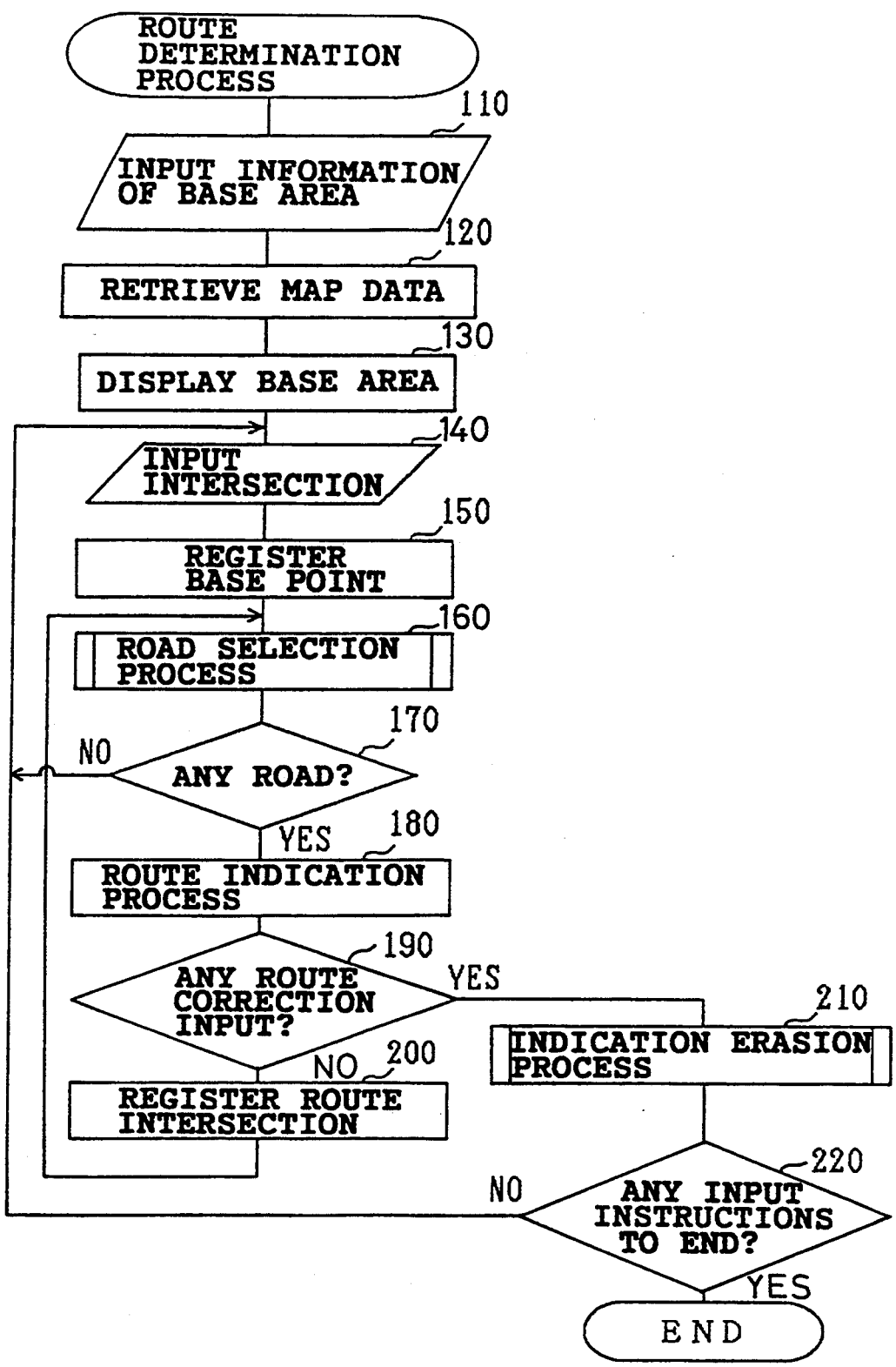
FIG. 5 is a flow chart showing the route determination process controlled by the main controller.

As shown in FIG. 5, responsive to an instruction to start the route determination process, the information concerning the area from which to start navigation is input at step 110, to provide an area map on which a user locates a base point. Upon receipt of this information, the flow proceeds to step 120.

When preparing a road map, a wide area map may be first displayed, which is next gradually enlarged by pointing with a cursor to obtain a more detailed map on which the user locates and inputs a base point. Alternatively, the information input may be in the form of, for example, longitude and latitude data of the base point, or x-coordinate and y-coordinate data of any landmark buildings nearby the base point.

Following step 120, map data including the base point input at step 110 is retrieved from the external storage device 6 and fed to the RAM 26. During the data retrieval, the map data unit including the input base point, which is referred to as the central map unit hereafter, is first retrieved from among all of the map data units M11–Mnm, and subsequently three other map data units are retrieved. The three other map data units, which are referred to as the peripheral map units hereafter, correspond to the areas which are adjacent to the central map unit and lie in the driving direction. The four map units including the central map unit and the three peripheral map units are then stored in the RAM 26. At the following step 130, display data is prepared and thereby a road map is displayed on the display 14.

Thus the process at step 120 and at step 130 serves as a display control means M3.

For instance, if the information of point A in FIG. 9 is input as the base area, a central map unit M85 including the point A and three peripheral map units M75, M76, and M86 are retrieved. The three peripheral map units M75, M76, and M86, which are respectively situated above, above right, and on the right side of the central map unit M85, are selected based on the relative location of the point A to the center of the central map unit M85. At the next step 130, display data is prepared, with the point A at its center, from the four map units, and a road map of range B1 shown by the broken line in FIG. 9 is displayed on the display 14.

At the following step 140, the location of the intersection where navigation of the vehicle is to be started, i.e. the base intersection, is input by operating the arrow keys (K) shown in FIG. 9 to place the cursor on the screen at the desired location and pressing an execute key provided on the input device 4.

The base intersection input at step 140 is then registered as the base point for determining a route at step 150. Specifically, when the intersection C1 on the road map of range B1 shown in FIG. 9 is designated as the base intersection, the address of the intersection C1 is stored in the memory area corresponding to the registered intersection numeral P1 indicative of the base intersection shown in FIG. 4.

Figure 6:
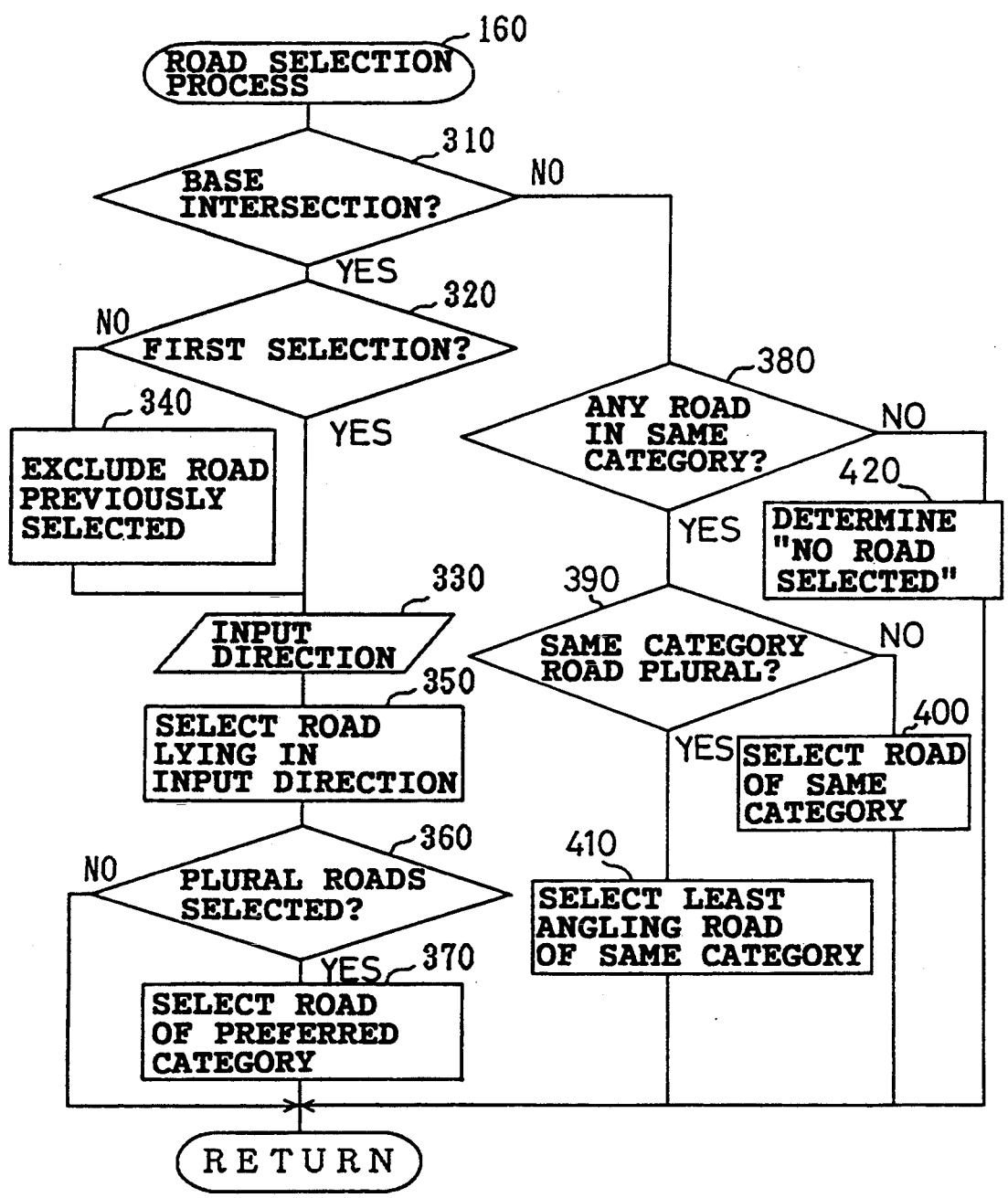
FIG. 6 is a flow chart showing the road selection process effected as step 160 as shown in FIG. 5.

At the next step 160, the road selection process starts in order to select a road to take from the base intersection designated in the manner described above or from the intersection at the end of the route already determined by the process which will be described later. The road selection process proceeds as shown in FIG. 6.

At step 310, it is examined whether the intersection at the end of the determined route is a base intersection. If "YES" is determined, it is next examined at step 320 whether the instant road selection is the first time with respect to this intersection. If "YES" is determined at step 320, the process step proceeds to step 330. If "NO" is determined at step 320, i.e. road selection has been formerly made for this intersection, the road selected at the former selection is excluded from the "candidate" or the possible roads as a route for the instant road selection at step 340, and the process step then goes to step 330.

At step 330, a driving direction from the intersection is input, designated by the arrow keys K provided on the input device 4, shown in FIG. 9. At the following step 350, any road lying ahead in the input driving direction is selected as a possible route to take from the intersection.

At step 360, it is examined whether a plurality of roads were selected at step 350. If it is determined that only one road has been selected, the instant process step ends. If it is determined that a plurality of roads have been selected, a road in a preferred road category is selected from the plurality of roads, and the instant process step ends. The preferred road category referred to in this embodiment is predetermined such that a turnpike is preferred to a highway and a highway is preferred to another ordinary roadways.

Turning back to step 310, if it is determined that the last intersection registered as a route intersection is not a base point, the process step goes to step 380. At step 380, it is examined whether there are any roads of the same category connected to the intersection. If "NO" is determined at this step, it is conclusively determined at step 420 that no road can be selected, and the process step ends. If "YES" is determined at the step 380, the process proceeds to step 390.

At step 390, it is examined whether a plurality of roads of the same category exist. If "NO" is determined, i.e. only one road of the same category exists, that road is selected at step 400 as a route to take. If "YES" is determined at step 390, the process goes to step 410 and a road forming the smallest angle to the route determined earlier is selected from the plurality of roads and determined as a further route, thereby ending the road selection process.

Thus, the road selection process has two different paths of process steps with respect to whether the intersection is a point to start navigation or merely one of the intersections on the route.

Specifically, the process at steps 320—370 serves as the first road selection means which selects and determines a road ahead of a base point in the driving direction designated by a user.

On the other hand, the process at steps 380–410 serves as the second road selection means. Thereby, a road of the same road category as the route determined earlier is selected as a route to take from an intersection that is not registered as the base point but is a mere intersection on the route.

Following the road selection process, the process step goes to step 170 to examine if a road has been selected by the road selection process. If "NO" is determined at the step 170, the flow goes back to step 140 where an input designating an intersection from which route determination is to resume is awaited. Upon receipt of this information, the process goes to step 150 to register the input intersection as the base point. Subsequently, the process at steps 310–370 of the road selection process 160 is again effected, thus serving as a route determination resumption means M13.

Meanwhile, following the determination at step 170 that a road has not been selected, an intersection as a new base intersection need not necessarily be designated with the arrow keys on the input device 4. Alternatively, by operating only the execute key, the route determination is resumed from the end of the route determined earlier.

If "YES" is determined at step 170, the process proceeds to step 180 as route indication control means where the selected road is indicated as a route on the road map displayed on the display 14.

Figure 7:
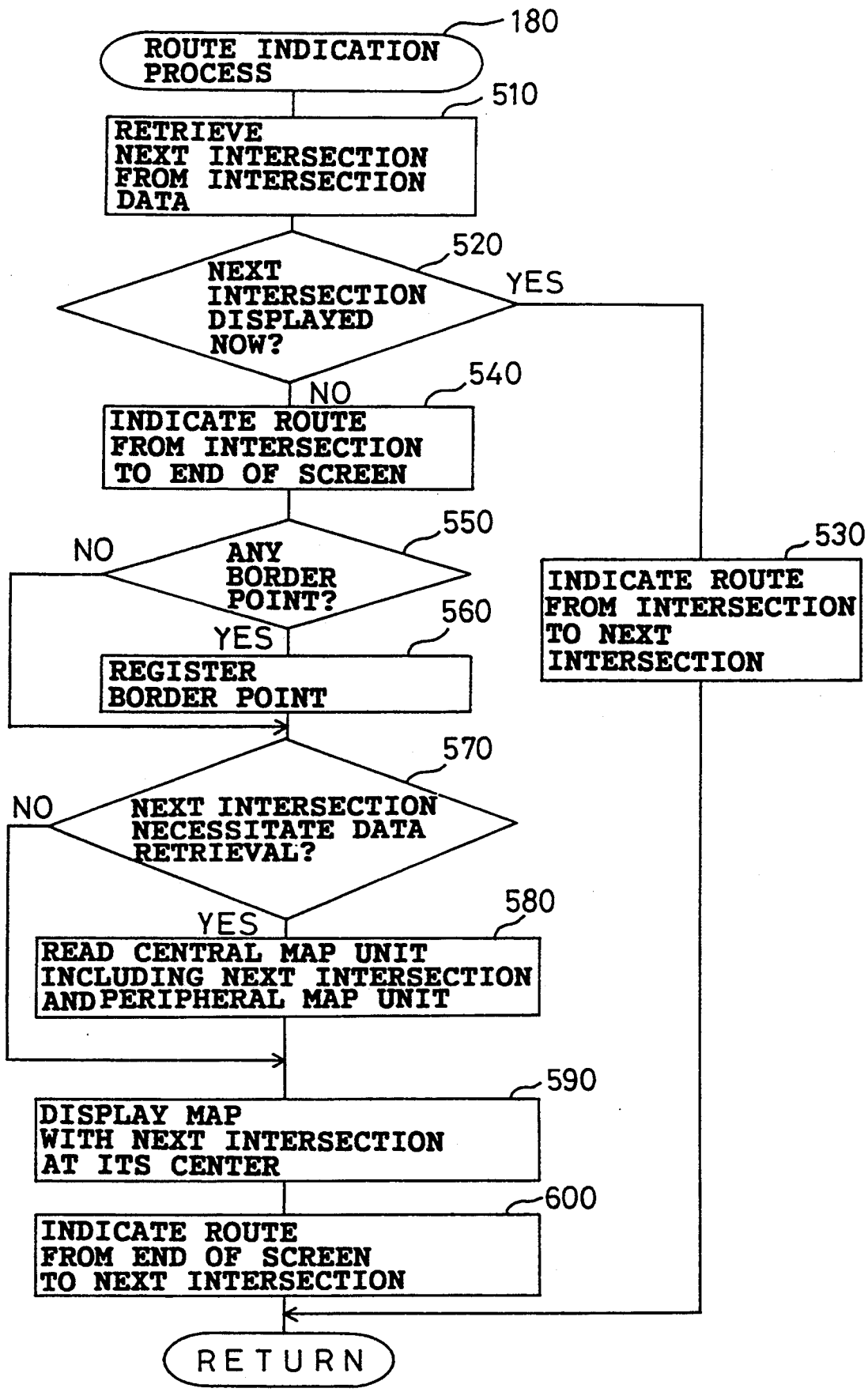
FIG. 7 is a flow chart showing the route indication process effected as step 180 as shown in FIG. 5.

Route indication is performed in the manner shown in FIG. 7. Specifically, at step 510, the next intersection, i.e. the intersection at the end of the last selected road, is retrieved from the intersection data and border point data. It is next examined at step 520 whether the next intersection is on the road map currently shown on the display 14. If "YES" is determined, the process step proceeds to step 530.

At step 530, the road from the intersection registered last as a route intersection to the next intersection is indicated as a route, and the instant process ends. Route indication may be made by accentuating the road by changing boldness, color, or type of lines of the illustrated road.

If it is determined at step 520 that the next intersection is beyond the road map currently shown on the display 14, the process step to step 540. At step 540, the road from the last intersection on the currently indicated route to the end of the screen of the display 14 is indicated as a route, and the process goes to step 550.

At step 550, it is examined if there is a map unit border point between the last route intersection and the next intersection. If "YES" is determined, the border point is registered, step 560, as a route border point. The registration of the route border point is effected by, as shown in FIG. 4, up-dating the numeral "j" of the memory area in corresponding registered border point numeral Pij, and storing the address of the border point.

After the step 560, where any border point intermediate the last route intersection and the next intersection is registered, or if it is determined at step 550 that there is no border point between the last route intersection and the next intersection, the process step proceeds to step 570 to examine whether the next intersection is beyond the area S shown by double-dot-dash line in FIG. 9. The area S is concentric with the area covered by the four map units now stored in the RAM 26, and corresponds to the size of the map data that the screen of the display 4 can show at one time. As long as a next intersection is located within the area S, a new data retrieval to the RAM 26 is unnecessary. If it is determined at step 570 that the next intersection is beyond the area S, the process step goes to step 580.

At step 580, data is retrieved, similarly to step 120, to obtain a central map unit including the next intersection and three peripheral map units. At the following step 590, display data is prepared from the four map units in the same manner as in step 130, and a road map with the next intersection at its center is displayed.

If, on the other hand, it is determined at step 570 that the next intersection is within the area S, the process step goes directly to step 590 where a road map is displayed on the display 4 with the next intersection at its center.

After the road map displayed on the display 4 is changed to one including the next intersection, the process step goes to step 600 where a further part of the route is indicated on the newly displayed road map from the end of the screen of display 14 to the next intersection, and the instant process step ends.

Thus, the process steps 530, 540, and 600 of the instant road selection process serve as route indication control means M7 to indicate a route on the road map displayed on the display 14. If the next intersection is on the road map currently displayed on the screen, the displayed road map is not changed and a route from the last intersection to the next intersection is indicated by the process at step 530. On the other hand, if the next intersection is beyond the currently shown road map, a part of the route from the last intersection to the end of the currently displayed road map is first indicated by the process at step 540, the displayed road map is quickly changed to one including the next intersection as a result of step 590 serving as first display change control means, and a further part of the route from the end of the newly displayed road map to the next intersection is indicated by the process at step 600.

For instance, when the driving direction is designated on the road map of range B1 shown in FIG. 9, to be up and to the right of the base point C1, a route from the base intersection C1 to the next intersection C2 is indicated as a result of the process at step 530 without changing the displayed road map, since the next intersection C2 is within the range B1.

On the other hand, when the intersection C2 is registered as a route intersection and the driving direction is designated to be up and to the left of the intersection C2, the next intersection C3 is beyond the range of B1. In this case, the route between the intersection C2 and C3 is first indicated within the range of B1, step 540, and then, a central map unit M45 including the next intersection C3 and peripheral map units M35, M34, and M44 are retrieved, step 580, from the external storage device 6 to the RAM 26. Subsequently, the road map displayed on the display 14 is changed to that of B2, shown by a broken line in FIG. 9, showing the intersection C3 at its center, step 590. Consequently, the remaining part of the route between the intersection C2 and C3 is indicated within the range of B2, step 600.

In order to expedite changing of the road maps displayed on the display 14, the present road selection process does not always retrieve data for the next intersection located beyond the currently shown road map, but incorporates step 570 to examine whether the next intersection is within the area S making data retrieval unnecessary. If it is determined that the next intersection is within the area S, a road map is obtained from the four map units presently stored in the RAM 26.

Following a route indication, it is next examined at step 190 if any cancellation of the route has been instructed through a cancel key provided on the input device 4. If "NO" is determined, the last intersection on the indicated route is registered as a route intersection, step 200, and the process goes to step 160. The registration of the route intersection is performed by storing the address of the intersection in the memory area corresponding to the registered intersection numeral Pi.

On the other hand, if it is determined at step 190 that a cancellation of the route is instructed, the process goes to step 210.

At step 210, the corresponding route indication is erased and registration of the corresponding route intersection(s) and route border point(s) are deleted. The process at step 210 thus serves as the indication erasion process.

Figure 8:
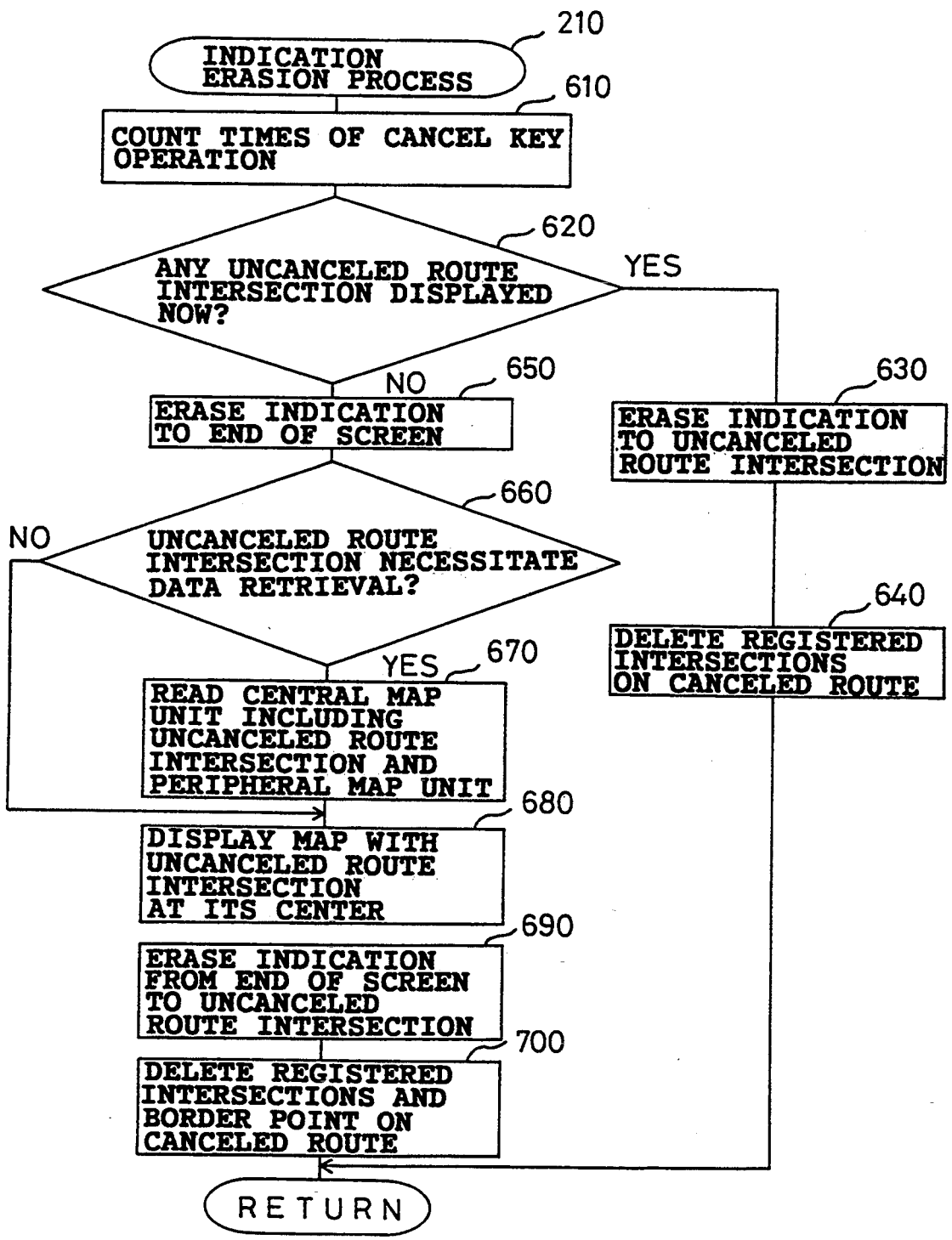
FIG. 8 is a flow chart showing the route indication erasion process effected at step 210 as shown in FIG. 5.

The indication erasion process is performed, as shown in FIG. 8, in the following manner.

First, the number of times the instruction to cancel the route was input, i.e. the number of times the cancel key was operated, is counted and regarded as the number of road sections between route intersections to be canceled, step 10. At the next step 620, it is examined whether the last remaining uncanceled route intersection, thus still effective as a route intersection and which will be hereunder referred to as "uncancelled route intersection", is on the road map currently displayed on the display 14. If "YES" is determined, the process proceeds to step 630.

At step 630, the route indication is erased to the uncancelled route intersection. At the next step 640, the registration of the canceled route intersection(s) are deleted, thereby ending the instant process.

On the other hand, if it is determined at step 620 that there is no intersection still effective as a route intersection shown on the displayed road map, the process step goes to step 650 where the route indication is erased to the end of the current road map shown on the screen. At the next step 660, it is examined whether the uncanceled route intersection is within the area S, similarly to the process at step 570.

If it is determined at step 660 that the uncancelled route intersection is beyond the area S, the process step goes to step 670. At step 670, a central map unit including the uncancelled route intersection and its peripheral map units are retrieved, as in the process at steps 120 and 580. At the following step 680, display data is prepared from these map units, and a road map is displayed with the uncanceled route intersection at its center.

On the other hand, if it is determined at step 660 that the uncanceled route intersection is within the area S, the process step goes directly to step 680, thereby displaying on the display 14 a road map with the uncanceled route intersection at its center.

After changing the road map displayed on the display 14, the route indication is erased from the end of the screen of the display 14 to the uncanceled route intersection, step 690. Consequently, the registration of the route intersection(s) and route border point(s) on the canceled route is deleted, step 700, and the instant process step ends.

Thus, during the indication erasure process, the process at steps 630–650, 690, and 700 serves as a route cancel control means to erase an indication of the route on the display 14 and to delete the registered route intersection(s) and route border point(s).

If the uncanceled route intersection is displayed on the road map currently shown, the route indication is erased to the uncanceled route intersection, and deletion of registered route intersection(s) and route border point(s) are also effected to the uncanceled route intersection, without changing the displayed road map, within the range of the currently shown road map, 630 and 640.

If the uncanceled route intersection is not on the road map currently displayed, the route indication is first erased to the end of the screen of the display 14, step 650, and a road map including the uncanceled route intersection at its center is quickly prepared and displayed as a result of the process at step 680 now serving as second display change control means. At subsequent steps 690 and 700, the route indication is erased from the end of the screen to the uncanceled route intersection. Then, the registration of the route intersections and route border points on the erased route are deleted.

For example, when a single instruction to cancel the route is input, when the screen of the display 14 is currently displaying the road map of the range B2, as shown in FIG. 9, the uncanceled route intersection is the intersection C2, which is far beyond the range B2. In this case, the route indication from the intersection C3 to the end of the screen of range B2 is first erased at step 650. A central map unit M75 including the intersection C2 and peripheral map units M76, M86, and M85 are next retrieved from the external storage device 6 to the RAM 26, step 670. Subsequently, the road map currently displayed on the display device 14 is changed to that of range B11 with the intersection C2 at its center, step 680. Consequently, the route indication is erased from the end of the screen of range B1 to the intersection C2.

Thus, in order to expedite changing of the displayed road map, data is not always retrieved in the indication erasure process when the intersection is not currently displayed on the screen. Instead, when it is determined at step 660 that the intersection is within the area S, a road map situating the intersection at its center is prepared from the four map units already stored in the RAM 26.

After cancellation of the route according to the indication erasure process of step 210 in response to an instruction to correct the route, the process goes to step 220 to examine whether an instruction to end route determination is input through the input device 4.

If it is determined at step 220 that an instruction to end route determination is input, it is determined that the route determination is completed, and the process step ends.

If "NO" is determined at step 220, the process step goes back to step 140 where the last intersection on the determined route is registered as the base point from which to resume route determination, and an input designating a driving direction is awaited similarly to the process at step 170 determining no road can be selected. The process at step 140 thus also serves as route determination resumption means.

In the instant embodiment, the provision of the process at step 140 allows the user to confirm the last intersection on the determined route after steps 170 and 220 are completed. Therefore, the process may go back to step 150, instead of step 140, thus automatically determining the last intersection on the route as the base point to resume route determination.

The procedure for determining a route with the navigation system according to the instant embodiment is as follows.

Information concerning the base area to start navigation is first input. Responsive to this information, a road map covering the base area is displayed on the display 14 as a result of the process at steps 110–130.

A base intersection is next input by designating it with a cursor on the screen. A driving direction is also input. Then, according to this input information, a route is determined as a result of the process at step 160. Subsequently, the processes at steps 170–200, and at step 160 are repeated, thereby automatically selecting roads of the same category as the road first selected, and determining the roads as routes, intersection by intersection, consecutively from the base point.

A user can view the proceeding of the route determination process on the display 14. Should a determined road stray from a desired route, the determined route can be corrected by instructing at the input device 4. Responsive to this instruction, the indication erasure process of step 210 is effected. Specifically, automatic operation of route determination is stopped, the route is canceled, intersection by intersection, from the last one to those determined earlier, and the indication corresponding to the canceled route is erased on the display 14.

When cancellation of the route is effected or when automatic selection of a road cannot be executed due to the difference of road category lying ahead of an intersection, the present navigation system enters a standby condition awaiting input of the driving direction. Upon receipt of this information, the navigation system resumes determination of route, recognizing the last uncanceled route intersection as the base intersection, and continues the automatic route determination unless a route can no longer be determined due to a difference of road category or any instruction is received to correct the determined route.

As mentioned above, a user can view the proceeding of the automatic route determination. Should the determined route stray from a desired route, the route determination process can be immediately stopped and the route can be corrected. Thus, a desired route can be readily and quickly determined.

Further, if the road selected as a route extends beyond the currently displayed road map, the road map is changed, for example, from the range of B1 to that of B2 in FIG. 9, to situate the last intersection of the selected road at its center and indicate the route on the road map. Similarly, in canceling the route, a road map not having a last route intersection is changed to one having the last uncancelled intersection at its center.

Therefore, even if the destination is distant from the base point and beyond the road map currently shown on the display 14, easy, correct, and speedy route determination is attained. Accordingly, the present navigation system proves to be especially useful when applied in route determination for long distance driving using, for instance, turnpikes.

This invention has been described above with reference to a preferred embodiment as shown in the drawings. Modifications and alterations may become apparent to one skilled in the art upon reading and understanding the specification. Despite the use of the embodiment for illustration purposes, it is intended to include all such modifications and alterations within the scope and the spirit of the appended claims.

In this spirit, it should also be noted that following peripheral functions can be attained and therefore included in the present invention.

Since a route is determined intersection by intersection, i.e. with respect to each intersection, the distance between the base point and the destination can be readily and accurately obtained by adding up the distance between intersections every time an intersection numeral C1 corresponding to a registered intersection numeral P1 is registered on the route. Similarly, during driving, the remaining distance to go from a current position may be computed and indicated.

Further, since the automatic determination of a route can be stopped at any desired point, any desired subsidiary information, such as a famous viewpoint(s) or residence(s) of an acquaintance nearby, may be input at that point. The subsidiary information may be indicated on the display 14 or announced during driving navigated by the present system.

I claim:

1. A navigation system for a vehicle having a route selection mode and a navigation mode, said system comprising:

displaying means for displaying a road map thereon;

road map data storage means for storing road map data to be displayed on said display means, said road map data including road category type data indicative of a category of each road included in the road map data;

display control means for controlling said display means to display a road map, during route selected and during navigation, according to the road map data stored in said road map data storage means;

input means for inputting a base point and a driving direction when said system is in the route selection mode;

first road selection means for selecting a road to be taken, when said system is in the route selection mode, according to the driving direction and the road map data, from the base point to an intersection with the selected road forming a portion of a selected route;

route indication control means for controlling said display means to indicate on the displayed road map, when aid system is in the route selection mode, the selected road of said first road selection means to be taken on said route;

second road selection means for selecting a next road to be taken on said route, when said system is in the route selection mode, according to the road category type of the selected road and the road map data, from an end of the previously selected road to a next intersection;

first display change control means for displaying the next road on the displayed road map, when said system is in the route selection mode, and for determining whether the next intersection is displayed on the road map currently shown on said display means and, if said first display change control means determines that the next intersection is beyond the currently displayed road map, changing the displayed road map, when said system is in the route selection mode, to a road map including the next intersection with said next intersection being displayed at the center of said display means;

determination means for determining whether or not a next road has been determined by said second road selection means and, if said determination means determines that a next road has been determined, activating said second road selection means to select a further road connected to an end of the previously selected road;

route cancel input means for receiving an input instruction to halt at least one of said first and second road selection means from performing road selection and to cancel at least a portion of the previously selected route; and route cancel control means for canceling, in response to the input instruction, at least a portion of the previously selected route in response to the input instruction and erasing a corresponding indication of the canceled route from said display means with said erasing proceeding from a last input intersection toward a first input intersection.

2. A navigation system according to claim 1, wherein said navigation system further comprises:

second display change control means for determining whether a last intersection on an uncancelled portion of the previously selected route is displayed on the road map currently displayed on said display means and, if said second display change control means determines that the last intersection is not displayed on the currently displayed road map, changing the displayed road map to a road map including the last intersection.

3. A navigation system according to claim 2, wherein said navigation system further comprises:

route determination resumption means for activating said first road selection means to resume operation upon receipt of an input designating a driving direction, and recognizing the end of the uncancelled route as a new base point, when one of (1) said determination means determines that said second road selection means has not selected a further road to be taken, and (2) said route cancel control means finishes cancellation of a desired portion of said route in response to an instruction to cancel a portion of the previously selected route.

4. A navigation system according to claim 3, wherein said navigation system further comprises an antenna and a receiver for receiving a transmission signal for indicating, during use, a position and velocity of the vehicle.

5. A navigation system according to claim 3, wherein said road map data storage means is one of an optical disk and a magnetic disk and said display means is one of a cathode ray tube and a liquid crystal screen.

6. A navigation system according to claim 3, wherein said navigation system further comprises a main controller comprising:
- a central processing unit;
- a ROM;
- a RAM;
- an input/output port; and
- a bus line interconnecting said central processing unit, said ROM, said RAM and said input/output port with one another; and said main controller communicates with said display control means for controlling said display means.

7. A method of selecting a route for navigating a roadway comprising the steps of:
- displaying a road map on a display means;
- storing road map data to be displayed on said display means during route selection in a road map data storage means, said road map data including road category type data indicative of a category of each road included in the road map data;
- controlling with a display control means, said display means, to display a road map during route selection according to the road map data stored in said road map data storage means;
- inputting a base point and a driving direction with an input means during route selection;
- selecting, according to the driving direction and the road map data, with a first road selection means during route selection, a road to be taken from the base point to an intersection with the selected road forming a portion of a selected route;
- controlling said display means, with a route indication control means, to indicate on the displayed road map, during route selection, the road selected by said first road selection means;
- selecting, according to the road category type of the selected road and the road map data, with second road selection means during route selection a next road to be taken as a further road to be taken on said selected route from end of the previously selected road to a next intersection;
- determining during route selection, with a first display change control means, whether the next intersection is displayed on the road map currently displayed on said display means and, if said first display change control means determines that the next intersection is beyond the currently displayed road map, changing the display road map to a road map including the next intersection;
- determining during route selection, with a determination means, whether or not a next road has been determined by said second road selection means and, if said determination means determines that a next road has been determined, again activating said second road selection means to select a further road connected to an end of the previously selected road;
- receiving during route selection, with a route cancel input means, an input instruction to halt at least one of said first and said second road selection means from performing road selection and to cancel at least a portion of the previously selected route;
- canceling during route selection, in response to the input instruction, with a route cancel control means at least a portion of the previously selected route in response to the input instruction and erasing a corresponding indication of the canceled route from said display means;
- determining during route selection, with a second display change control means, whether a last intersection on an uncancelled portion of the previously selected route is displayed on the road map currently displayed on said display means and, if said second display change control means determines that the last intersection is not displayed on the currently displayed road map, changing the displayed road map to a road map including the last intersection; and
- resuming during route selection, with a route determination resumption means, operation of said first road selection means upon receipt of an input designating a driving direction, and recognizing the end of the uncancelled route as a new base point, when one of (1) said determining means determines that said second road selection means has not determined a further road to be taken and (2) said route cancel control means finishes cancellation of a portion of said route in response to an instruction to cancel a portion of the previously selected route.

8. A method of selecting a route for navigating a roadway according to claim 7, wherein said navigation system further comprises the step of:
- retrieving, using said first display change control means, upon determining that the next intersection is not on the currently displayed road map, a central map unit, including the next intersection, and three peripheral map units, and preparing a new current road map from all four retrieved map units with the next intersection located at the center of said current road map, said retrieved road map is substantially the size of said display means, and said three peripheral map units lie adjacent said central map unit and in said driving direction.

9. A navigation system for a vehicle having a route selection mode and a navigation mode, said system comprising:
- display means for displaying a road map thereon;
- road map data storage means for storing road map data to be displayed on said display means, said road map data including road category type data indicative of a category of each road included in the road map data;
- display control means for controlling said display means to display a road map, during route selection and during navigation, according to the road map data stored in said road map data storage means;
- input means for inputting a base point and a driving direction when said system is in the route selection mode;
- first road selection means for selecting a road to be taken, when said system is in the route selection mode, according to the driving direction and the road map data, from the base point to an intersection with the selected road forming a portion of a selected route;
- route indication control means .for controlling said display means to indicate on the displayed road map, when said system is in the route selection mode, the selected road of said first road selection means to be taken on said route;
- second road selection means for selecting a next road to be taken on said route, when said system is in the route selection mode, according to the road category type of the selected road and the road map data, from an end of the previously selected road to a next intersection;

first display change control means for displaying the next road on the displayed road map, when said system is in the route selection mode, and for determining whether the next intersection is displayed on the road map currently shown on said display means and, if said first display change control means determines that the next intersection is beyond the currently displayed road map, changing the displayed road map, when said system is in the route selection mode, to a road map including the next intersection with said next intersection being displayed at the center of said display means; and wherein said first display change control means, upon determining that the next intersection is not on the currently displayed road map, retrieves a central map unit, including the next intersection, and three peripheral map units, and prepares a new current road map from all four retrieved map units with the next intersection located at the center of said current road map, and said retrieved road map is substantially the size of said display means.

10. A navigation system according to claim 9, wherein said three peripheral map units lie adjacent said central map unit and in said driving direction.

* * * * *